United States Patent
Wittenbrook

[11] 3,879,386
[45] Apr. 22, 1975

[54] AMINO SUBSTITUTED 1,2,4-TRIAZINONES
[75] Inventor: Lawrence S. Wittenbrook, Marysville, Ohio
[73] Assignee: O. M. Scott & Sons Company
[22] Filed: June 22, 1973
[21] Appl. No.: 372,599

[52] U.S. Cl. .............................. 260/248 AS; 71/93
[51] Int. Cl. ............................................. C07d 55/10
[58] Field of Search .............................. 260/248 AS

[56] References Cited
UNITED STATES PATENTS
3,138,593  6/1964  Burch ................................ 260/248

OTHER PUBLICATIONS
Guo et al., Chemical Abstracts, Vol. 61 entry 5651d (1964).
Matolscy et al., Chemical Abstracts, Vol. 69, entry 2039d (1968).

Primary Examiner—John M. Ford
Attorney, Agent, or Firm—James B. Raden; Harold J. Holt

[57] ABSTRACT
Compounds having the structural formula

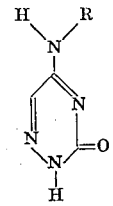

wherein
R is methyl, ethyl, furfuryl,

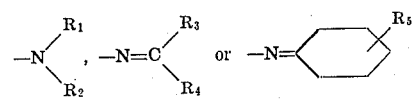

in which
$R_1$ is hydrogen or methyl;
$R_2$ is phenyl, acetyl or propionyl when $R_1$ is hydrogen and $R_2$ is methyl when $R_1$ is methyl;
$R_3$ is hydrogen or $C_1$-$C_6$ alkyl;
$R_4$ is $C_1$-$C_6$ alkyl, phenyl or $C_1$-$C_3$ carboalkoxy; and
$R_5$ is hydrogen or $C_1$-$C_6$ alkyl.
The compounds are useful for inhibiting the upright growth of cool season turfgrasses and some monocot weed species found with turfgrasses.

10 Claims, No Drawings

AMINO SUBSTITUTED 1,2,4-TRIAZINONES

This invention relates to a new class of chemical compounds and specifically to certain amino-substituted 1,2,4-triazinones.

A few amino substituted 1,2,4-triazinones have been reported. For example, 5-amino-1,2,4-triazin-3(2H)-one is shown by Falco, et al., *J. Am. Chem. Soc.* 78, 1938 (1956), and 5-hydrazino-1,2,4-triazin-3(2H)-one is shown by Sorm et al., *DoKlady Akad, Nauk SSSR* 137, 1393–5 (1961).

The present invention involves the discovery of a new class of triazinone compounds which exhibit outstanding biological activity. The compounds of the present invention have the structural formula

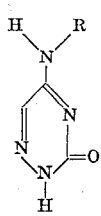

wherein
R is methyl, ethyl, furfuryl,

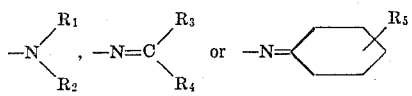

in which
R$_1$ is hydrogen or methyl;
R$_2$ is phenyl, acetyl or propionyl when R$_1$ is hydrogen and R$_2$ is methyl when R$_1$ is methyl;
R$_3$ is hydrogen or C$_1$–C$_6$ alkyl;
R$_4$ is C$_1$–C$_6$ is alkyl, phenyl or C$_1$–C$_3$ carboalkoxy; and
R$_5$ is hydrogen or C$_1$–C$_6$ alkyl.

The compounds of the present invention are particularly useful for inhibiting the upright growth of cool season trufgrasses and some monocot weed species found with turfgrasses.

Examples of compounds falling within the scope of the above formula are 1. 5-furfurylamino-1,2,4-triazin-3(2H)-one
2. 5-methylamino-1,2,4-triazin-3(2H)-one
3. 5-(2'-phenylhydrazino)-1,2,4-triazin-3(2H)-one
4. 5-(2',2'-dimethylhydrazino)-1,2,4-triazin-3(2H)-one
5. 5-(2'-acetylhydrazino)-1,2,4-triazin-3(2H)-one
6. 5-(2'-isopropylidenehydrazino)-1,3,4-triazin-3(2H)-one
7. 5-(2'-ethylpyruvalidene hydrazino)-1,2,4-triazin-3(2H)-one
8. 5-(2'-tridecyli-7-denehydrazino)-1,2,4-triazin-3(2H)-one
9. 5-(2'-(3''-methylcyclohexylidene)hydrazino)-1,2,4-triazin-3(2H)-one The compounds of the present invention may be prepared by reacting 6-azauracil (1,2,4-triazin-3,5-dione) with phosphorous pentasulfide to produce the thio derivative 4-thio-6-azauracil. The thio derivative is then reacted with the appropriate amine or hydrazine in the presence of a suitable solvent, such as a low molecular weight alcohol to produce compounds where R is methyl, ethyl furfuryl or

For example, the preparation of 5-methylamino-1,2,4-triazin-3(2H)-one is illustrated by the following equation:

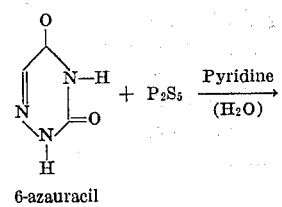

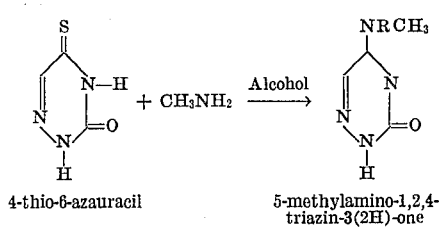

The preparation of 5-hydrazino-1,2,4-triazin-(2H)-one would be as set forth above except that hydrazine would replace methyl amine. Compounds in which R is

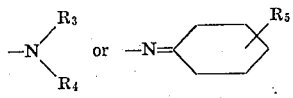

would require further reaction of the aforementioned hydrazino derivatives with an aldehyde or ketone in the presence of a suitable solvent, such as ethanol, and a suitable acid catalyst, such as acetic acid, as exemplified in the following equation:

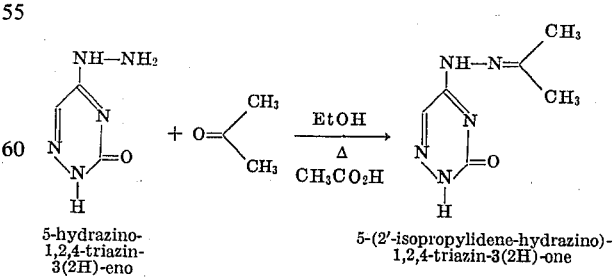

The following examples illustrate the preparation of compounds within the scope of the present invention:

EXAMPLE 1

The thio derivative of 6-azauracil was prepared as follows: To a vigorously stirred mixture of 6-azauracil, 8.0g (71 m mole), in 250 ml. pyridine and ten drops of water was cautiously added phosphorous pentasulfide, 7.5g. (34 m mole). The reaction mixture was refluxed for three hours. Removal of solvent in vacuo afforded a residue which was dried over phosphorous pentoxide in vacuo. This material was slurried in water, treated with 10% sodium hydroxide solution (pH 9), and filtered. Acidification (pH 3) of the filtrate with conc. hydrochloric acid solution gave a precipitate which was extracted with ethyl ether. The combined ether extracts were washed with water, dried over magnesium sulfate, filtered, and evaporated in vacuo to give 8.5g. (94%) of 4-thio-6-azauracil as an orange solid, mp 219°–221°. An infrared spectrum of the crude material compared with that of authentic 4-thio-6-azauracil.

The following is a typical procedure for the preparation of an amino derivative of the invention, in this case 5-furfurylamino-1,2,4-triazin-3-one, by reaction of the foregoing thio compound with furfurylamine. To a stirred slurry of 4-thio-6-azauracil, 7.8g. (0.06 mole), in 75 ml. n-propanol was added dropwise furfurylamine, 17.5g. (0.18 mole), over a period of 35 minutes (mildly exothermic) at room temperature. When the addition was completed, the reaction mixture was stirred overnight (18 Hr.) at ambient temperature. The pale yellow precipitate was filtered, washed with water, and dried; 6.9g. (52%), m p 245.5°–248° (uncor.). Recrystallization from etahnol-water (ca 1:1) afforded pure 5-furfurylamino-1,2,4-triazin-3(2H)-one, m p 251.5–253.5°C.

Calcd. for $C_8H_8N_4O_2$: C, 40.74; H, 4.17; N, 29.00. Found: C, 50.00; H, 4:09; N, 29.20. $\lambda_{MAX}^{KBr}$ 3.17, 3.22μ(N—H); 6.02, 6.33, 6.50μ (C=O, ring vibrations)

EXAMPLE 2

This example illustrates a typical preparation of a compound in which R is

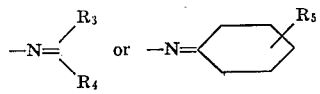

by further reaction of 5-hydrazino-1,2,4-triazin-3(2H)-one, prepared as in Example 1 except that hydrazine was used in place of furfurylamine, with acetone. In this case, the specific compound prepared was 5-(2'-isopropylidenehydrazino)-1,2,4-triazin-3(2H)-one. 5-hydrazino-1,2,4-triazin-3(2H)-one, 4.0g. (31 m mole), prepared from 4-thio-6-azauracil and hydrazine, and acetone, 4.0g. (69 m mole) was refluxed in ethanol and a few drops of acetic acid for three hours. Filtration and drying of the precipitate in vacuo over phosphorous pentoxide afforded 4.1g. (80%) of 5-(2'-isopropylidenehydrazino)-1,2,4-triazin-3(2H)-one as a yellow solid, m p 216°–8° (dec). A pure sample of 5-(2'-isopropylidenehydrazino)-1,2,4-triazin-3(2H)-one was obtained as a yellow powder, m p 216°–8°C by recrystallization from ethanol.

Calcd. for $C_6H_9N_5O$: C, 43.11; H, 5.43: N, 41.89. Found: C, 42.90; H, 5.95; N, 41.30. $\lambda_{MAX}^{KBr}$ 1648 (C=N), 1588 (C=O), 3250–2800 cm$^{-1}$ (N—H)

EXAMPLE 3

Additional compounds within the scope of the invention were prepared substantially similarly to Examples 1 and 2. The melting points and calculated v found chemical content of the compounds are set forth in the following table. The numbers of the compounds correspond to those set forth in the specification above.

| Compound | M.p., °C | Formula | | C | H | N |
|---|---|---|---|---|---|---|
| 1 | 251.5–253.5 | $C_8H_8N_4O_2$ | Calcd | 50.00 | 4.19 | 29.16 |
| | | | Found | 50.00 | 4.10 | 29.19 |
| 2 | >300 | $C_4H_6N_4O$ | Calcd | 38.09 | 4.79 | 44.43 |
| | | | Found | 38.32 | 5.17 | 44.42 |
| 3 | 248–9 | $C_9H_9N_5O$ | Calcd | 53.20 | 4.46 | 34.47 |
| | | | Found | 53.50 | 4.21 | 34.21 |
| 4 | 244–6 | $C_5H_9N_5O$ | Calcd | 38.70 | 5.85 | 45.14 |
| | | | Found | 37.65 | 6.15 | 44.67 |
| 5 | 245–6 | $C_6H_7N_5O_2$ | Calcd | 35.50 | 4.17 | 41.41 |
| | | | Found | 35.50 | 4.14 | 41.50 |
| 6 | 216–8 | $C_6H_9N_5O$ | Calcd | 43.11 | 5.43 | 41.89 |
| | | | Found | 42.90 | 5.95 | 41.30 |
| 7 | 188–191 | $C_8H_{11}N_5O_3 \cdot H_2O$ | Calcd | 39.50 | 5.39 | 28.80 |
| | | | Found | 39.43 | 5.36 | 29.17 |
| *8 | <40 | $C_{16}H_{29}N_5O$ | Calcd | — | — | — |
| | | | Found | — | — | — |
| 9 | 64–4 | $C_{10}H_{15}N_5O$ | Calcd | 54.29 | 6.83 | 31.65 |
| | | | Found | 54.15 | 7.27 | 31.27 |

*Because of difficulties in analyzing this compound, spectral data were relied upon to establish structure.

I claim:
1. A compound having the structural formula

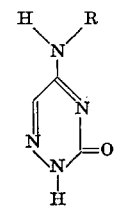

wherein
R is selected from the group consisting of ethyl, methyl, furfuryl

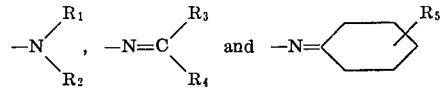

in which
- $R_1$ is selected from the group consisting of hydrogen and methyl;
- $R_2$ is selected from the group consisting of phenyl, acetyl and propionyl when $R_1$ is hydrogen and $R_2$ is methyl when $R_1$ is methyl;
- $R_3$ is selected from the group consisting of hydrogen and $C_1$–$C_6$ alkyl;
- $R_4$ is selected from the group consisting of $C_1$–$C_6$ alkyl, phenyl and $C_1$–$C_3$ carboalkoxy; and
- $R_5$ is selected from the group consisting of hydrogen and $C_1$–$C_6$ alklyl.

2. 5-furfurylamino - 1,2,4-triazin-3(2H)-one.
3. 5-methylamino - 1,2,4-triazin-3(2H)-one.
4. 5-(2'-phenylhydrazino)-1,2,4-triazin-3(2H)-one.
5. 5-2', 2''-dimethylhydrazino)-1,2,4-triazin-3(2H)-one.
6. 5-(2'-acetylhydrazino)-1,2,4-triazin-3(2H)-one.
7. 5-(2'-isopropylidenehydrazino)-1,2,4-triazin-3(2H)-one.
8. 5-(2'-ethylpyruvalidene hydrazino)-1,2,4-triazin-3-(2H)-one.
9. 5-(2'-tridecyli - 7-denehydrazino) - 1,2,4-triazin-3-(2H)-one.
10. 5-(2'-3-methylcyclohexylidene) hydrazino) - 1,2,4-triazin-3(2H)-one.

* * * * *